United States Patent [19]
Artzberger

[11] Patent Number: 4,779,418
[45] Date of Patent: Oct. 25, 1988

[54] REMOTE CONTROL SYSTEM FOR A SOIL COMPACTOR

[75] Inventor: Thomas G. Artzberger, Menomonee Falls, Wis.

[73] Assignee: M-B-W Inc., Slinger, Wis.

[21] Appl. No.: 15,733

[22] Filed: Feb. 17, 1987

[51] Int. Cl.$^4$ ............................................. F16D 31/02
[52] U.S. Cl. ........................................ 60/444; 60/484; 91/424; 91/437; 91/459; 91/466; 91/520; 91/527; 180/132; 180/272; 404/84; 404/133
[58] Field of Search ................. 91/424, 437, 459, 443, 91/466, 467, 520, 527; 404/84, 133; 180/132, 272; 60/443, 444, 445, 484

[56] References Cited

U.S. PATENT DOCUMENTS

| | | | |
|---|---|---|---|
| 3,236,049 | 2/1966 | Reinke | 60/464 X |
| 3,521,450 | 7/1970 | Martin | 60/443 |
| 3,881,317 | 5/1975 | Swoager | 60/444 |
| 3,921,503 | 11/1975 | Kubik | 60/444 X |
| 3,986,358 | 10/1976 | Hoffmann | 60/444 X |
| 4,077,445 | 3/1978 | Wirt | 91/520 X |
| 4,156,575 | 5/1979 | Konig et al. | 404/84 |
| 4,167,855 | 9/1979 | Knapp | 60/445 |
| 4,508,014 | 4/1985 | Shoff | 91/527 |

Primary Examiner—Edward K. Look
Attorney, Agent, or Firm—Andrus, Sceales, Starke & Sawall

[57] ABSTRACT

A hydraulic operated control system for remotely operating a walk-behind soil compactor. A remotely operated three-position valve is connected to the pressure line of the hydraulic system of the soil compactor and serves to control the flow of hydraulic fluid to opposite ends of a hydraulic cylinder unit that is operably connected to a hydraulic pump which operates the speed and direction control for the compactor. The cylinder unit includes a piston that is slidable within the cylinder and the piston is biased to a neutral position by springs. Through remote operation of the valve, hydraulic fluid will be directed to either end of the cylinder to provide direction and speed control for the compactor. A deadman switch is located on the remote control panel and manual release of the deadman switch will open the hydraulic circuit between the opposite ends of the cylinder to prevent fluid from being directed to the cylinder and will enable the springs to return the cylinder to a neutral no speed position. The return line from the cylinder is connected to a second valve which conrols the supply of hydraulic fluid to the steering system for the compactor.

4 Claims, 1 Drawing Sheet

REMOTE CONTROL SYSTEM FOR A SOIL COMPACTOR

BACKGROUND OF THE INVENTION

Walk behind soil compactors are self-propelled units and include a vibratory compacting drum. The operator walks behind the compactor and operates the steering, speed and directional movements through actuation of control levers on a panel located to the rear of the compactor.

Frequently, walk behind compactors are used to compact soil in a trench, and if the trench has considerable depth it is dangerous for the operator to walk behind the compactor in the trench. Accordingly, remote controls have been proposed for compactors in which the operator, standing on the ground above the trench, can control movement of the compactor within the trench.

Conventional remote control systems are normally electronically operated using radio frequencies or light beams. However, the conventional remote control system are extremely costly and troublesome in operation resulting in high maintenance costs. As a further disadvantage, the electronically operated remote control systems cannot generally be retrofitted to existing equipment and can only be applied to new equipment.

SUMMARY OF THE INVENTION

The invention is directed to a simple and inexpensive remote control system for a soil compactor that utilizes the existing hydraulic system of the compactor, and eliminates the need for expensive and complicated electronic equipment.

In accordance with the invention, the compactor includes an operating lever connected to the hydraulic pump that controls the speed and directional movement of the compactor under normal walk-behind conditions. In accordance with the invention, the piston rod of a hydraulic cylinder is connected to the operating lever, and a three-position, main control valve, which is connected in the hydraulic system on the compactor can be operated remotely by an operator using a remote control box which is connected through electrical leads to the main control valve. Through remote operation of the valve, fluid can be selectively supplied to opposite ends of the cylinder to thereby operate the control lever. The control lever is biased to a neutral position and movement of the lever in either direction from the neutral position will produce forward or reverse movement, while the magnitude of movement of the lever in either direction controls the speed.

The remote control box used by the operator also includes a deadman switch which must be actuated by the operator in order to operate the main control valve and control speed and directional movement. Release of the deadman switch will open a second valve which is connected across the hydraulic lines leading to opposite ends of the cylinder. Opening of the second valve will prevent flow of fluid to the cylinder and the piston will automatically be biased to a neutral condition to prevent movement of the compactor.

Flow control valves or restricters are located in the lines leading to the respective ends of th cylinder and serve to control the rate of flow fluid from the cylinder to thereby regulate the speed of movement of the control lever.

A third steering control valve is connected in the return from the main control valve and operates the steering mechanism for the compactor. By actuation of a switch on the remote control box, the steering control valve can be operated to supply fluid to opposite ends of a second cylinder which is connected through a linkage to the steering mechanism of the compactor to thereby steer the compactor remotely.

The remote control system of the invention is a simple and inexpensive system which utilizes the existing hydraulic system of the compactor. As complicated electronic controls are eliminated, the system is trouble free, which substantially reduces maintenance costs over electronic systems.

The remote control system can be retrofitted to existing compactors in the field or can be installed with new equipment.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
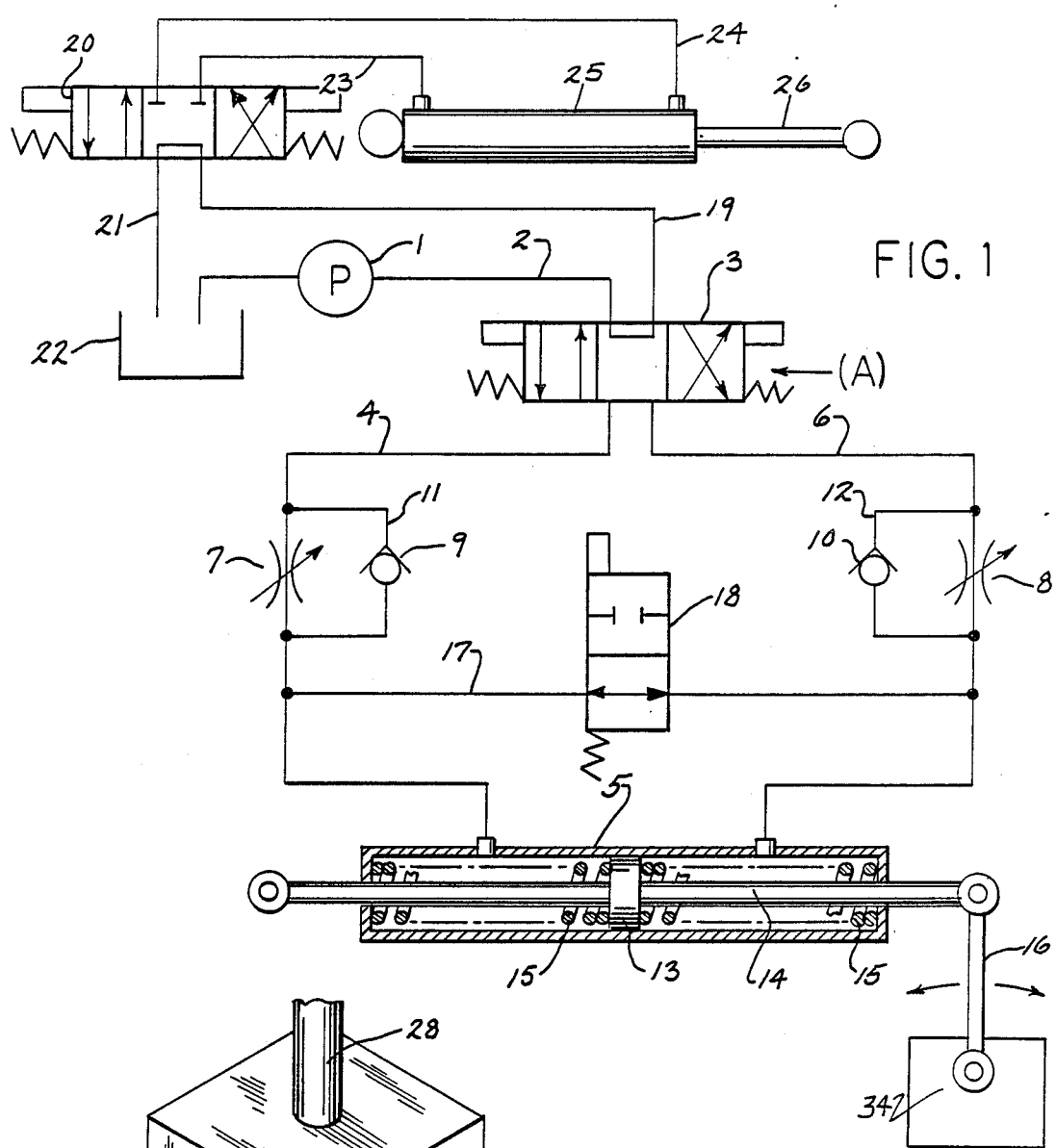
FIG. 1 is a flow sheet showing the hydraulic system of the remote control.

FIG. 1 is a flow diagram illustrating the hydraulically operated remote control system for a soil compactor. The system includes a pump 1 which is part of the normal hydraulic system of the compactor and supplies hydraulic fluid through a pressure line 2 to a three position solenoid operated valve 3 that is mounted on the soil compactor. Line 4 connects valve 3 with one end of a hydraulic cylinder 5, while a second line 6 connects the opposite end of the cylinder with the valve 3.

Flow control valves or restrictors 7 and 8 are connected in lines 4 and 6, respectively, while check valves 9 and 10 are connected around the flow control valves 7 and 8 in lines 11 and 12, respectively. Check valves 9 and 10 permit the flow of fluid in a direction from valve 3 to the respective ends of cylinder 5 but prevents flow in the opposite direction.

As illustrated diagrammatically in FIG. 1, a piston 13 is slidable within cylinder 5, and a piston rod 14 connected to piston 13 extends outwardly through opposite ends of the cylinder. Springs 15 are located between piston 13 and the respective ends of cylinder 5 and serve to bias the piston to a central or neutral location in cylinder 5.

One end of piston rod 14 is pivotably connected to a crank or lever 16 that in turn is connected to a hydraulic pump 34 for speed and directional control of the soil compactor. Lever 16 has a central or neutral position and by moving the lever in either direction forward or reverse movement will imparted to the compactor and the arc of movement of the lever will control the speed of movement in a conventional manner. Pump 34 is a standard in-line variable displacement type, in which lever 16 operates to tilt the swash plate of the pump to vary the output in a conventional manner to control the speed as well as the forward or reverse movement of the soil compactor.

A line 17 is connected across lines 4 and 6 and a normally open, solenoid operated deadman valve 18 ss connected in line 17. If valve 18 is closed by manual actuation of a switch on a remote control box, as hereinafter described, fluid can be supplied through lines 4 or 6 to the cylinder 5, but if valve 18 is open, fluid will not be supplied through lines 4 or 6 and springs 15 will move the piston 13 and control lever 16 to a neutral position to prevent movement of the compactor.

A return line 19 is connected between valve 3 and a second, solenoid operated, three position valve 20 that acts to control the steering for the compactor. Line 21 connects valve 20 to a reservoir 22 which in turn is connected to pump 1 through line 2.

To control the steering, lines 23 and 24 are connected between valve 20 and respective ends of a cylinder 25. A piston rod 26 is slidable within cylinder 25 and one end of the piston rod is connected through a suitable linkage, not shown, to the steering column. By introducing fluid through lines 23 or 24 to cylinder 25 the steering column will be rotated through the linkage to affect steering control for the compactor.

Figure 2:
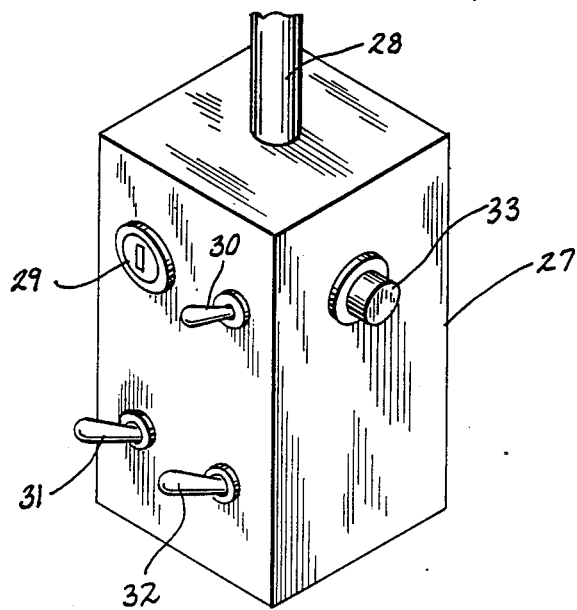
FIG. 2 is a perspective view of the remote control box.

The speed, direction and steering, as well as operation of the compactor engine and vibrator, are controlled remotely by an operator using a remote control box 27. Cable 28 is connected between control box 27 and the compactor and the cable contains the electrical leads that are connected to valves 3, 18 and 20 as well as the electrical leads for the engine and the vibrator on the compactor. As shown in FIG. 2, a key-operated ignition switch 29 is mounted on control box 27 and is employed to start the compactor engine, and an "off-on" switch 30 on box 27 control operation of the vibratory unit on the compactor.

In addition, switch 31 on box 27 is connected to solenoid valve 3 and controls speed and directional movement, while switch 32 is connected to solenoid valve 20 and acts to control steering of the compactor.

Mounted on the side of control box 27 is a "deadman" switch 33 that is connected to dead-man valve 18. By depressing switch 33, valve 18 will be closed to permit hydraulic fluid to flow to cylinder 5 as switch 31 is actuated.

The remote control system of the invention is a simple and inexpensive arrangement that utilizes the existing hydraulic system of the compactor and eliminates expensive and complex electronic controls.

Engine and vibrator operation, as well as speed, direction and steering control, are all operated through the remote control box and a dead-man switch on the control box insures that movement of the compactor will stop on manual release of the switch.

Various modes of carrying out the invention are contemplated as being within the scope of the following claims particularly pointing out and distinctly claiming the subject matter which is regarded as the invention.

I claim:

1. In combination, a soil compactor, a hydraulic system mounted on said compactor and including a source of hydraulic fluid under pressure and having a pressure line for supplying fluid under pressure and having a return line for returning fluid to said source, first valve means connected to said pressure line and said return line, direction and speed control means having a neutral position, a forward position and a reverse position, fluid cylinder means operably connected to said direction and speed control means for moving said direction and speed control means between said neutral, forward and reverse positions, said fluid cylinder means including a cylinder and a piston slidable with respect to said cylinder and operably connected to said direction and speed control means, said first valve means having a first position wherein said pressure line is connected to a first end of said cylinder and said return line is connected to a second end of said cylinder to thereby move said speed and direction control means in said forward direction, said first valve means having a second position wherein said pressure line is connected to said second end of the cylinder and said return line is connected to said first end of said cylinder to thereby move said direction and speed control means in said reverse direction, said first valve means also having a third position wherein said pressure and return lines are disconnected with both ends of said cylinder and said direction and speed control means is in said neutral position, manual operating means located at a remote location with respect to said comparator, connecting means connecting said manual operating means with said first valve means for selectively moving said first valve means between said first, second and third positions to thereby correspondingly move said direction and speed control means between said forward, reverse and neutral positions steering means for steering said compactor, second valve means connected in said return line between said first valve means and said source and having a first position wherein said return line is connected to said steering means in a manner to operate said steering means in one direction and said second valve means having a second position wherein said return line is connected to said steering means in a manner to operate said steering means in the opposite direction, and said second valve means having a third position wherein said return line is disconnected from said steering means.

2. The system of claim 1, and including by-pass valve means interconnected between said pressure and return lines, a manually engageable deadman control associated with said operating means and operably connected to said by-pass valve means, said deadman control being constructed and arranged so that actuation of said deadman control will close said by-pass valve means to permit fluid to flow to said cylinder and release of said deadman control will open said bypass valve means to prevent flow of fluid to said cylinder.

3. The system of claim 1, and including a restrictor disposed in each of said lines, and check valve means connected in parallel with each restrictor, each check valve means permitting flow of fluid in the respective line in a direction from said first valve means to said cylinder and preventing flow in the opposite direction.

4. The system of claim 1, and including biasing means for biasing said first valve means to said third position.

* * * * *

UNITED STATES PATENT AND TRADEMARK OFFICE
CERTIFICATE OF CORRECTION

PATENT NO. : 4,779,418

DATED : October 25, 1988

INVENTOR(S) : THOMAS G. ARTZBERGER

It is certified that error appears in the above-identified patent and that said Letters Patent is hereby corrected as shown below:

Col. 4, Line 26, CLAIM 1    Delete "comparator" and substitute therefor ---compactor---

Signed and Sealed this

Twenty-fourth Day of October, 1989

Attest:

DONALD J. QUIGG

Attesting Officer

Commissioner of Patents and Trademarks